Sept. 23, 1958     R. O. MAZE     2,852,937
LIQUID LEVEL INDICATING APPARATUS
Filed April 7, 1955     2 Sheets-Sheet 1
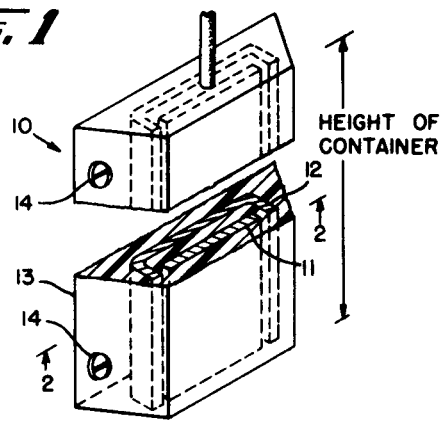
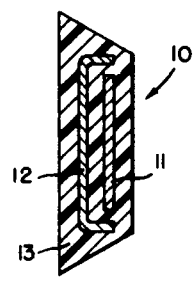
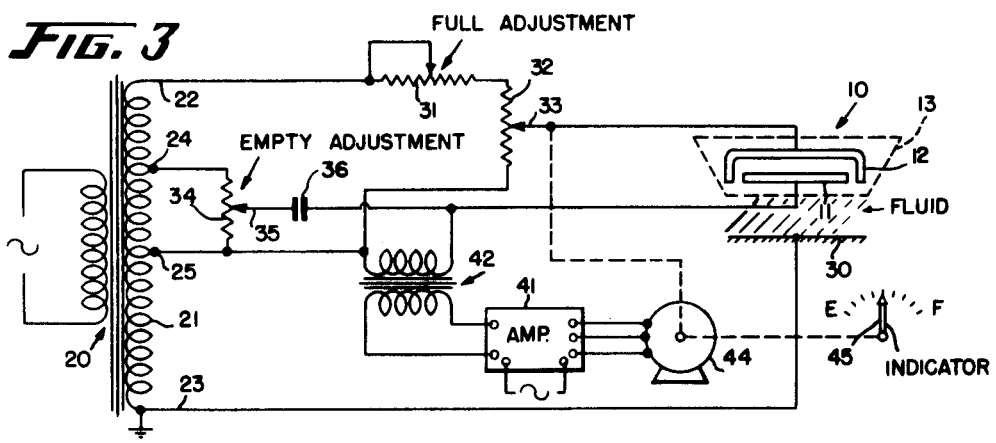
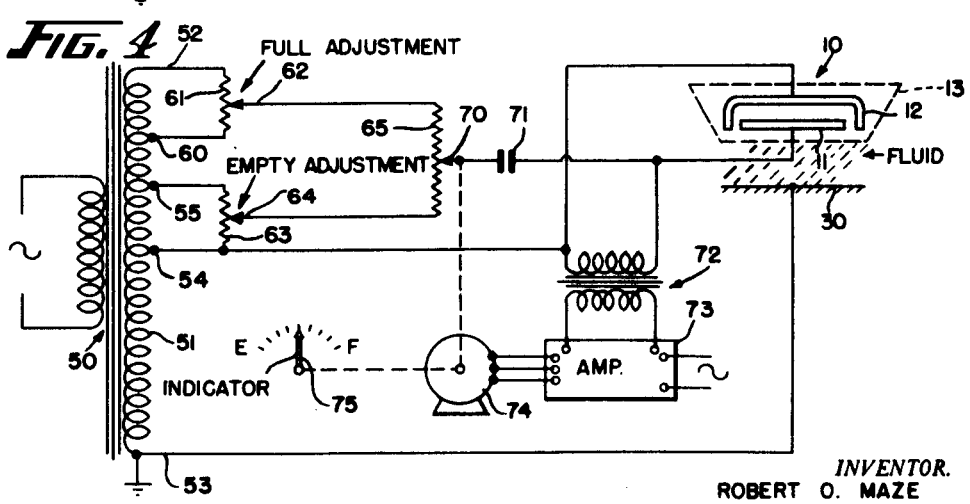
INVENTOR.
ROBERT O. MAZE
BY Joseph E Ryan
ATTORNEY INVENTOR.
ROBERT O. MAZE
BY Joseph E Ryan
ATTORNEY

United States Patent Office 2,852,937
Patented Sept. 23, 1958

2,852,937

LIQUID LEVEL INDICATING APPARATUS

Robert O. Maze, St. Paul, Minn., assignor to Minneapolis-Honeywell Regulator Company, Minneapolis, Minn., a corporation of Delaware Application April 7, 1955, Serial No. 499,820

7 Claims. (Cl. 73—304)

The present invention is concerned with an improved fluid level indication or measurement system in which the capacitance of a probe is proportional to the level of the fluid, in particular, a probe having a plurality of spaced plates in a dielectric, the capacitance between one of the plates and the fluid being indicative of the level.

While there are presently available on the commercial market highly accurate and dependable capacitance type fluid indicating or measuring systems, these systems are primarily adapted for use in aircraft for measuring or indicating the quantity of gas or other nonconducting mediums in the many fuel tanks on the craft. There is a need for an accurate and yet rugged device for indicating or measuring the fluid level in a container for conducting mediums.

In the highly industrialized world in which we are living there is a continuous use of storage facilities in which large containers, tanks or bins are used to store various types of conducting fluid substances. No matter where such a storage container is used there is a need for a level measuring or indicating system to properly indicate or control the level of the fluid in the container continuously or at any particular time. In many cases such as in the wood pulp industry or the mining industry, the probe or sensor for such a system must be rugged and able to withstand the conditions commonly experienced. Yet, when the detector is placed in the indicating system, accuracy, which of course is important, is maintained.

In the present invention a simple, rugged and inexpensive probe or sensor is used and it is connected into a particular type of capacitance bridge to provide for accurate and dependable indication or control of the level of the liquid in a container. In particular the probe has a plurality of plates sealed in a dielectric or non-conducting member so that the member can be inserted in a container of fluid and the plates will be electrically insulated from each other as well as the fluid. The capacitance between one of the plates and the fluid is indicative of the level of the fluid. A second plate is used as a means of shielding the first plate. When connected into the bridge circuit this second plate provides for more accurate measurement by reducing the leakage from the first plate to ground or compensating for the changes in the dielectric characteristic of the member.

It is therefore an object of the present invention to provide an improved, rugged capacitance type fluid level responsive system.

Another object of the present invention is to provide an improved fluid level indication or control system having a probe with a capacitance indicative of the fluid level, the probe having a plurality of plates sealed in a dielectric.

Still another object of the present invention is to provide an improved conducting fluid level sensitive system having a probe and a capacitance bridge, the detector comprising a plurality of plates sealed in a member, a first being connected in the bridge so that the capacitance between it and the liquid is indicative of fluid level, a second being connected in the bridge so that the capacitance between it and the first plate compensates for the change in the dielectric characteristics of the member.

Still another object of the present invention is to provide an improved fluid level sensitive system having a probe and a capacitance bridge, the probe comprising a plurality of plates sealed in a member a first being connected in the bridge so that the capacitance between it and the liquid is indicative of fluid level, a second being connected in the bridge so that the leakage from the first plate to ground is minimized.

These and other objects will become apparent upon reading the following specification and drawings of which:

Figure 1 is a perspective view of the probe or sensor with its inner section removed to show the plates as they are molded into the dielectric member;

Figure 2 is a cross sectional view of the probe shown in Figure 1;

Figure 3 is one embodiment of a capacitance type bridge in which the U-shaped plate of the probe is connected into the bridge circuit in a manner to compensate for changes in the dielectric characteristics of the probe member;

Figure 4 is another embodiment of a capacitance type bridge in which the U-shaped plate of the probe is connected in such a manner to reduce the leakage from a sensing plate to ground thereby increasing the accuracy of the fluid level system.

Figure 5:
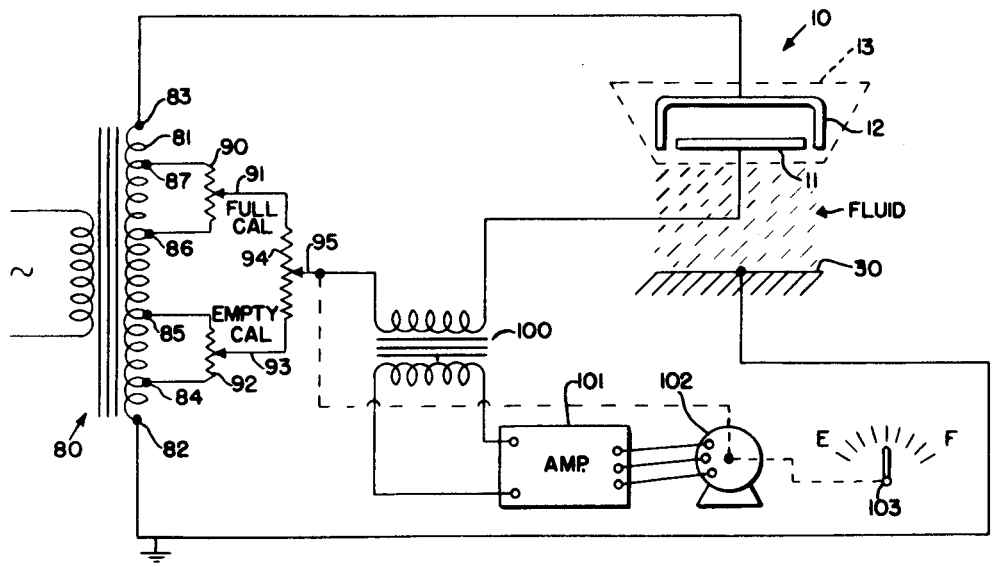
Figure 5 is another embodiment of a capacitance bridge to which the U-shaped probe is connected.

Referring to Figure 1, a perspective view of a probe sensor 10 is shown. The probe has a pair of plate members 11 and 12 that are molded in a dielectric or nonconducting material to form member 13. The material is of some sort of plastic substance, an example being Teflon, which has the characteristic of being nonwetting when used with the moist fluids whose level is to be indicated or controlled. The characteristic of nonwetting is readily identified by placing the material of which member 13 is made into the liquid or fluid and upon taking it out it flows from the material leaving the surface clean. Such a characteristic is necessary as the unit depends upon the capacitance between plate 11 and the liquid. Should the probe 10 remain wet, that is, the fluid stick on the probe making a continuous conductive layer upon the probe even when the level of the fluid was low, its measurement is inaccurate. Plate 12 has a U-shape and member 11 is spaced in the open part of the U so that when the back side of the probe is mounted against the inside surface of a container U-shaped member 12 is between member 11 and the container. Figure 2 shows how plates 11 and 12 are molded in the dielectric member 13. The probe is adapted to be fastened by screws 14 against the inside surface of the container and due to its shape and sturdiness it is quite rugged for most applications. It is obvious that such a probe unit is relatively inexpensive and it is rugged enough to withstand the severe abuse of most applications.

Referring to Figure 3 one embodiment of a capacitance type bridge circuit is shown for use with such a probe. The bridge has a power supply 20 with a secondary winding 21 having a pair of end terminals 22 and 23, and taps 24 and 25. Terminal 23 is connected to ground, as well as, a container 30 in which the fluid is contained. Connected between terminal 22 and tap 25 is a full adjustment resistor 31 having a movable tap thereon for shorting a portion of the resistance of the circuit and a rebalance resistor 32 having movable wiper 33 thereon. Connected between taps 24 and 25 is a resistor 34 having a movable wiper 35 thereon for empty adjustment which is connected through a capacitor 36 to plate 11 of probe 10. Plate 12 of the detector is connected to rebalance wiper 33. The output of the bridge circuit as obtained between tap 25 and member 11 is connected to an amplifier 41 through an input transformer 42. Amplifier 41 is connected to a motor 44 for driving a pointer 45 of a conventional indicator or any appropriate responsive device and positioning wiper 33 of the rebalance resistor. The amplifier and motor combination is of a sort disclosed in the Albert P. Upton Patent No. 2,423,534 which is phase sensitive so that the motor runs in a direction depending on the phase of the input signal to the amplifier.

In the normal capacitance type bridge with a plurality of legs the capacitance of one leg is compared to a reference capacitance so that when the capacitances are equal the output from the bridge circuit is zero and the control motor is inactive. When the variable capacitance increases above that of the other an unbalance is established to cause rotation of the motor. The capacitance between member 11 and ground 30 which depends upon the level of the fluid in the container, is compared with the capacitance between members 11 and 12 which can be said to be the reference capacitance. Any change in the dielectric of member 13 alters the capacitance between member 11 and ground and between members 11 and 12 and the result has substantially no effect on the bridge accuracy. This is quite important where accuracy in the level indication or control is required as in aging, temperature and pressure variations, the dielectric characteristics of materials used for such a probe change. As connected U-shaped member 12 shields member 11 to reduce its leakage to ground. The leakage current to ground of member 12, even though it passes through rebalance resistor 32, is not sufficient to impair the accuracy of the level measurement for some applications.

Referring to Figure 4 another embodiment of the bridge network circuit is shown. Power supply 50 has a secondary 51 with a pair of end terminals 52 and 53 and taps 54, 55 and 60. End terminal 53 is grounded and connected to container 30. Connected between tap 60 and end terminal 52 is a full adjustment resistor 61 having a movable wiper 62 thereon. Connected between taps 54 and 55 is an empty adjustment resistor 63 having a movable wiper 64 thereon. A rebalance resistor 65 having a movable wiper 70 is connected between wiper 62 and wiper 64. Rebalance wiper 70 is connected to member 11 through a reference capacitor 71. Member 12 of the probe is connected to tap 54. The output of the bridge circuit as obtained between tap 54 and member 11 is connected by input transformer 72 to amplifier 73. Motor 74 is driven by the output of the amplifier and positions indicator 75, as well as rebalance wiper 70. The amplifier motor combination is of the same sort as that in Figure 3.

The operation of motor 74 depends upon the capacitance between member 11 and ground or the level of the fluid in the container, this capacitance is compared with the reference capacitance 71 to so position indicator 75. Member 12 as connected in the bridge circuit of Figure 4 also acts as a shield but in a different manner. The capacitance between members 11 and 12 is actually connected across the input of transformer 72 and when the bridge is unbalanced the voltage to the input of transformer 72 is supplied to plates 11 and 12. By such a connection the voltage of members 11 and 12 is equal when the bridge is balanced. Thus any leakage from the probe will occur from member 12 as it is closest to the container on which the probe is mounted. This leakage current will pass through tap 54 on transformer 50 and will not affect the accuracy of the bridge in any manner. The shielding by member 12 when used in the circuit of Figure 4 is somewhat better than the shielding obtained in Figure 3; however, as the probe is connected in Figure 4, changes in the dielectric of member 13 will have some effect upon the accuracy of the level indication.

Referring to Figure 5 a third embodiment of a bridge network circuit is shown for use with probe 10. It has a source of power 80 having a secondary 81 with end terminals 82 and 83. A plurality of taps 84, 85, 86 and 87 are provided between end terminals 82 and 83. A full calibration resistor 90 is connected between taps 86 and 87. The resistor has a movable wiper 91 thereon. An empty calibration resistor 92 having a movable wiper 93 thereon is connected to taps 84 and 85. A characterized rebalance resistor 94 having a movable wiper 95 thereon is connected between wipers 91 and 93. Member 12 of probe 10 is connected to end terminal 83 as end terminal 82 is grounded and connected to container 30 in which the fluid or liquid whose level is to be measured is contained. The output of the bridge circuit as obtained between member 11 and the rebalance wiper 95 is connected to transformer 100 which is connected to the input of amplifier 101 for controlling motor 102 which positions indicator 103 as well as rebalance wiper 95. The bridge circuit of Figure 5 has some advantages over the circuits of Figures 3 and 4. In this circuit the capacitance between member 11 and the fluid is compared with the capacitance between members 11 and 12 to obtain a signal indicative of the level of fluid in container 30. The changes in dielectric of member 13 have substantially no effect upon the bridge circuit as it equally affects both the measuring leg of the bridge as well as the reference leg of the bridge. Member 12 shields member 11 and any leakage current to ground from member 12 goes through secondary 81 of the transformer from terminal 83 and has substantially no effect upon the operation of the circuit. Such an arrangement of rebalance resistor 94 requires a characterized resistance as it is obvious on movement of wiper 95 the voltage between member 11 and ground as well as the voltage between members 11 and 12 is adjusted, this being a nonlinear relation in order to use a linear scale on indicator 103 a characterized rebalance resistor is used.

Operation

Each of the bridge circuits shown in Figures 3, 4 and 5 are of a capacitance type when used with probe 10 as shown in Figures 1 and 2; however, each has its particular advantages and disadvantages which are selected for the particular application in which the liquid level system for control or indication is used. Referring specifically to Figure 3 probe 10 is mounted vertically on the inside of a container and screwed thereto by appropriate screws as shown in Figure 1. As the level of conducting fluid changed in the container the capacitance between member 11 and the fluid changes proportionately. As this capacitance is connected in one leg of the bridge circuit it is compared with the capacitance between members 11 and 12 in the adjacent leg of the circuit and an output current from the bridge is applied to the input of transformer 42. With the empty and full adjustments properly made the indicator as shown indicates that the container is approximately half full. Should the level of fluid decrease the capacitance between member 11 and the fluid would decrease to provide an output from the bridge circuit to energize motor 44 in a manner to readjust the voltage of the bridge upon movement of wiper 33 until a null condition again existed at which time the indicator pointer would have moved slightly to the left indicating a lowering of the level of the fluid in the container. As the dielectric of member 13 effects the capacitance of both the measuring leg and the reference leg of the bridge it is seen that any change in the dielectric due to aging or changes in temperature or pressure which might take place with such a probe has substantially no effect upon the accuracy of the bridge. As member 12 is closer to the container than member 11 it shields member 11 to reduce the leakage to the container directly from member 11. This is particularly important when the level of the fluid is low as any leakage from member 11 to the container would substantially affect the accuracy of the indication. While member 12 shields member 11 any leakage through the container or ground from member 12 will pass through the rebalance resistor 32 and this has some effect upon the accuracy of the bridge circuit; however, in some applications it could be tolerated.

The bridge circuit of Figure 4 when connected to probe 10 compares the capacitance between member 11 and the fluid with the capacitance of the reference capacitor 71, each of which are connected in opposite legs of the bridge. Thus, after calibration of the network by the adjustment of the full wiper 62 and the empty wiper 64 as shown the level of the fluid container is approximately half full. Upon a lowering of the fluid level the capacitance between member 11 and the fluid decreases so that an output current to transformer 72 of a particular phase and magnitude renders motor 74 operative to readjust wiper 70 to bring the bridge circuit back to a null condition at which time the indicator pointer is moved to the left. In this bridge circuit changes in the dielectric of member 13 are not compensated as such changes only affect the measuring leg of the bridge, that is, the capacitance between member 11 and the fluid. Member 11 is more adequately shielded in this circuit arrangement as at balance of the bridge circuit the voltage of members 11 and 12 are equal and any leakage to ground would occur from member 12 as it is closer to the container on which probe 10 is mounted. This leakage current would be supplied directly from tap 54 of secondary 51 and would not affect the accuracy of the bridge in any manner.

The bridge circuit arrangement as shown in Figure 5 uses the capacitance between member 11 and the fluid as the measuring capacitance and the capacitance between members 11 and 12 as the reference capacitance, these being connected in adjacent legs of the bridge. After proper adjustment of the full and empty calibration wipers 91 and 93 indicator 103 now indicates that the container is approximately half full. Upon a decrease in the level of the fluid in the container an output is supplied to transformer 100 of a particular phase and magnitude to cause energization of the motor 102 to rebalance the bridge upon movement of wiper 95 and the indicator pointer would move slightly to the left. Any change in the dielectric characteristics of member 13 affects both the measuring capacitance and the reference capacitance, thus has substantially no effect upon the accuracy of the bridge. As in Figure 3 member 12 shields member 11; however, any leakage to ground from member 12 only passes through secondary 81 from terminal 83 and does not impair the accuracy of the bridge. To place the rebalance resistor 94 in the circuit as shown requires a characterized resistor 94 if a linear scale is to be used on the indicator as adjustment of wiper 95 affects the voltage at both of the bridge legs that is the measuring circuit as well as the reference circuit. It is obvious that such a characterized resistance would be more expensive; however, if the added expense was worth the increased accuracy over the arrangement as shown in Figure 3 the bridge circuit of Figure 5 would be used, this all depends upon the particular application. It is obvious that if a linear scale were not needed in Figure 5 for indicator 103 a linear resistance could be used for resistor.

Throughout the specification and drawings indication of fluid level has been used in the explanation; however, it should be obvious to one skilled in the art that any sort of means responsive to the output of such a bridge circuit might be used for providing other functions than indication. It is intended that the scope of the present invention be limited only by the appended claims.

I claim as my invention:

1. In a bridge network system for determining the level of a conductive liquid within a container comprising: an alternating current source of voltage having a tap, said source of voltage comprising a first leg and a second leg of a first branch of said bridge; a probe for insertion into the container having at least two conducting plates integrally moulded in a nonwetting plastic dielectric member, said plates being electrically insulated from each other and the liquid in the container; the conductive liquid in the container being effectively connected to the first leg of said first branch and effectively located in a first leg of a second branch of said bridge; a first of the plates of said probe being located with respect to the liquid to coact therewith and the dielectric therebetween as a liquid level measuring capacitor to provide a signal that varies with the level of liquid in the container and the changes in the dielectric constant of the dielectric member; a second of the plates of said probe being connected to the second leg of said first branch and located in a second leg of said second branch and disposed with respect to said first plate to coact therewith and the dielectric therebetween as a dielectric compensator capacitor to provide a signal that varies with the changes in dielectric constant of the dielectric member; and a detecting means disposed in the detecting leg of said bridge operable upon an unbalance signal occurring in said bridge to vary the voltage in the second leg of said first branch to bring about balance of said bridge and to indicate the level of liquid in the container, said detecting leg being disposed between the tap of said source of voltage and the first plate of said probe.

2. In a bridge network system for determining the level of a conductive liquid within a container comprising: an alternating current source of voltage having a movable tap, said source of voltage comprising a first leg and a second leg of a first branch of said bridge; a probe for insertion into the container having at least two conducting plates integrally moulded in a nonwetting plastic dielectric member, said plates being electrically insulated from each other and the liquid in the container; the conductive liquid in the container being effectively connected to the first leg of said first branch and effectively located in a first leg of a second branch of said bridge; a first of the plates of said probe being located with respect to the liquid to coact therewith and the dielectric therebetween as a liquid level measuring capacitor to provide a signal that varies with the level of liquid in the container and the changes in the dielectric constant of the dielectric member; a second of the plates of said probe being connected to the second leg of said first branch, located in a second leg of said second branch and disposed with respect to said first plate to coact therewith and the dielectric therebetween as a dielectric compensator capacitor to provide a signal that varies with the changes in dielectric constant of the dielectric member; and detecting means disposed in the detecting leg of said bridge operable upon an unbalance signal occurring in said bridge to vary the voltage in the first and second leg of said first branch to bring about balance of said bridge and to indicate the level of the liquid in the container, said detecting leg being disposed between the movable tap of said source of voltage and the first plate of said probe.

3. In a bridge network system for determining the level of a conductive liquid within a container comprising: an alternating current source of voltage having a tap, said source of voltage comprising a first leg and a second leg of a first branch of said bridge; a probe for insertion into the container having at least two conducting plates integrally moulded in a nonwetting plastic dielectric member, said plates being electrically insulated from each other and the liquid in the container; the conductive liquid in the container being effectively connected to the first leg of said first branch and effectively located in a first leg of a second branch of said bridge, a first of the plates of said probe being located with respect to the liquid to coact therewith and the dielectric therebetween as a liquid level measuring capacitor to provide a signal that varies with the level of the liquid in the container and the changes in the dielectric constant of the dielectric member; a second of the plates of said probe being disposed with respect to said first plate to coact therewith and the dielectric therebetween as a dielectric compensator capacitor to provide a signal that varies with the changes in the dielectric constant of the dielectric member; one of said plates being connected to a second leg of said first branch; and rebalance means having a portion thereof connected to said tap and a further portion thereof connected to the other of said plates, said rebalance means responsive to an unbalance signal in said bridge to cause a voltage variation in at least one of the legs of said first branch to bring about balance of said bridge and to indicate the level of the material.

4. In a bridge network system for determining the level of a conductive liquid within a container comprising: an alternating current source of voltage having a tap, said source of voltage comprising a first leg and a second leg of a first branch of said bridge; a probe for insertion into the container having at least two conducting plates integrally moulded in a nonwetting plastic dielectric member, said plates being electrically insulated from each other and the liquid in the container; the conductive liquid in the container being effectively connected to the first leg of said first branch and effectively located in a first leg of a second branch of said bridge, a first of the plates of said probe being located with respect to the liquid to coact therewith and the dielectric therebetween as a liquid level measuring capacitor to provide a signal that varies with the level of the liquid in the container and the changes in the dielectric constant of the dielectric member; a second of the plates of said probe being disposed with respect to said first plate to coact therewith and the dielectric therebetween as a dielectric compensator capacitor to provide a signal that varies with the changes in the dielectric constant of the dielectric member; one of said plates being connected to the second leg of said first branch; said probe being attached to the wall of the container so that the second of the plates of said probe is disposed between the first of said plates and the wall of the container to thereby electrically shield said first plate from the container; and rebalance means having a portion thereof connected to said tap and a further portion thereof connected to the other of said plates, said rebalance means responsive to an unbalance signal in said bridge to cause a voltage variation in at least one of the legs of said first branch to bring about balance of said bridge and to indicate the level of the material.

5. In a bridge network arrangement for determining the level of a conductive material which tends to seek a horizontal level within a container comprising: a first source of voltage, a second source of voltage, a probe for insertion into the container comprising a plurality of electrodes moulded in a dielectric material, said electrodes being electrically insulated from each other and the material in the container; the material in the container, the first of said electrodes, and the dielectric therebetween comprising a measuring capacitor, said measuring capacitor being operatively connected to said first source of voltage to provide a signal indicative of the level of the material and which varies with changes in the dielectric constant of the dielectric member; said first electrode, a second of said electrodes, and the dielectric therebetween comprising a dielectric compensator capacitor, said dielectric compensator capacitor being operatively connected to said second source of voltage to provide a signal which varies with changes in the dielectric constant of the dielectric member, and rebalance means responsive to said signals to cause a variation in at least one of said sources of voltage to bring about balance in said bridge and controlled in accordance with the level of the material.

6. In an arrangement for determining the level of a conductive material which tends to seek a horizontal level within a container comprising: a probe for insertion into the container having a plurality of electrodes moulded within a dielectric member; a first circuit including a first source of voltage and a measuring capacitor comprised of the conductive material, a first of said electrodes, and the dielectric material therebetween for providing a first signal indicative of the level of the material and which varies with changes in the dielectric constant of said dielectric member; a second circuit including a second source of voltage and a dielectric compensator capacitor comprised of the first of said electrodes, a second of said electrodes, and a dielectric material therebetween for providing a second signal which varies with changes in the dielectric constant of the dielectric member, and means responsive to said first and second signals for providing an output in accordance with the relation between said signals.

7. In an arrangement for determining the level of a conductive material which tends to seek a horizontal level within a container comprising: a probe for insertion into the container having a plurality of electrodes moulded within a dielectric member; and circuit means whose output depends upon the deviation between the signal derived in a first circuit and in a second circuit; said first circuit including a voltage source, the conductive material and a first of said electrodes so that as the level of the conductive material changes in the container the signal of said first circuit is varied, the signal in said first circuit being further varied by changes in the dielectric constant of said dielectric member; said second circuit including a source of voltage, said first electrode and a second of said electrodes, the signal of said second circuit varying upon changes in the dielectric constant of said dielectric member so as to complement the changes in the signal from said first circuit due to changes in the dielectric constant of said dielectric member.

References Cited in the file of this patent

UNITED STATES PATENTS

| | | |
|---|---|---|
| 2,375,084 | Coroniti | May 1, 1945 |
| 2,622,442 | Boisblane | Dec. 23, 1952 |
| 2,699,523 | Meyers | Jan. 11, 1955 |
| 2,700,901 | Richner | Feb. 1, 1955 |

FOREIGN PATENTS

| | | |
|---|---|---|
| 1,058,592 | France | Nov. 4, 1953 |

OTHER REFERENCES

Nat. Bur. of Std. Technical News Bulletin, vol. 38, January 1954, pages 3 and 4.